(12) United States Patent
Foncin et al.

(10) Patent No.: US 11,404,711 B2
(45) Date of Patent: Aug. 2, 2022

(54) FUEL CELL SYSTEM

(71) Applicant: SAFRAN AEROTECHNICS, Plaisir (FR)

(72) Inventors: Charles Foncin, Saint-Cyr-l'École (FR); Sébastien Filangi, Magny les Hameaux (FR); Julien D'Arbigny, Versailles (FR)

(73) Assignee: SAFRAN AEROTECHNICS, Plaisir (FR)

( * ) Notice: Subject to any disclaimer, the term of this patent is extended or adjusted under 35 U.S.C. 154(b) by 0 days.

(21) Appl. No.: 17/257,983

(22) PCT Filed: Apr. 12, 2019

(86) PCT No.: PCT/FR2019/050863
§ 371 (c)(1),
(2) Date: Jan. 5, 2021

(87) PCT Pub. No.: WO2020/008120
PCT Pub. Date: Jan. 9, 2021

(65) Prior Publication Data
US 2021/0273248 A1 Sep. 2, 2021

(30) Foreign Application Priority Data

Jul. 6, 2018 (FR) ..................................... 1856221

(51) Int. Cl.
*H01M 8/04* (2016.01)
*H01M 8/0662* (2016.01)
(Continued)

(52) U.S. Cl.
CPC ..... *H01M 8/0662* (2013.01); *H01M 8/04022* (2013.01); *H01M 8/04097* (2013.01);
(Continued)

(58) Field of Classification Search
CPC ........... H01M 8/0662; H01M 8/04225; H01M 8/04022; H01M 8/04097; H01M 8/04231; H01M 8/04268
See application file for complete search history.

(56) References Cited

U.S. PATENT DOCUMENTS

2005/0058859 A1* 3/2005 Goebel ............. H01M 8/04097
429/415
2005/0058860 A1 3/2005 Goebel
(Continued)

FOREIGN PATENT DOCUMENTS

JP S63190257 A 8/1988

OTHER PUBLICATIONS

International Search Report dated Jul. 18, 2019, issued in corresponding International Application No. PCT/FR2019/050863, filed Apr. 12, 2019, 4 pages.
(Continued)

*Primary Examiner* — Olatunji A Godo
(74) *Attorney, Agent, or Firm* — Christensen O'Connor Johnson Kindness PLLC

(57) ABSTRACT

A fuel cell system for an aircraft includes a hydrogen burner, an oxidizing agent, and a fuel cell. The hydrogen burner has a first inlet suitable for receiving a first oxidizing agent, a second inlet capable of receiving at least hydrogen, and an outlet suitable for delivering a second oxidizing agent and heat. The oxidizing agent conditioning system has an inlet and an outlet, said inlet being suitable for receiving the second oxidizing agent and heat, said outlet being capable of delivering the conditioned second oxidizing agent. The fuel cell has an anode and a cathode, the cathode has a cathode inlet connected to the outlet of the oxidizing agent conditioning system, the cathode inlet receiving the conditioned second oxidizing agent.

9 Claims, 3 Drawing Sheets

Figure 1:
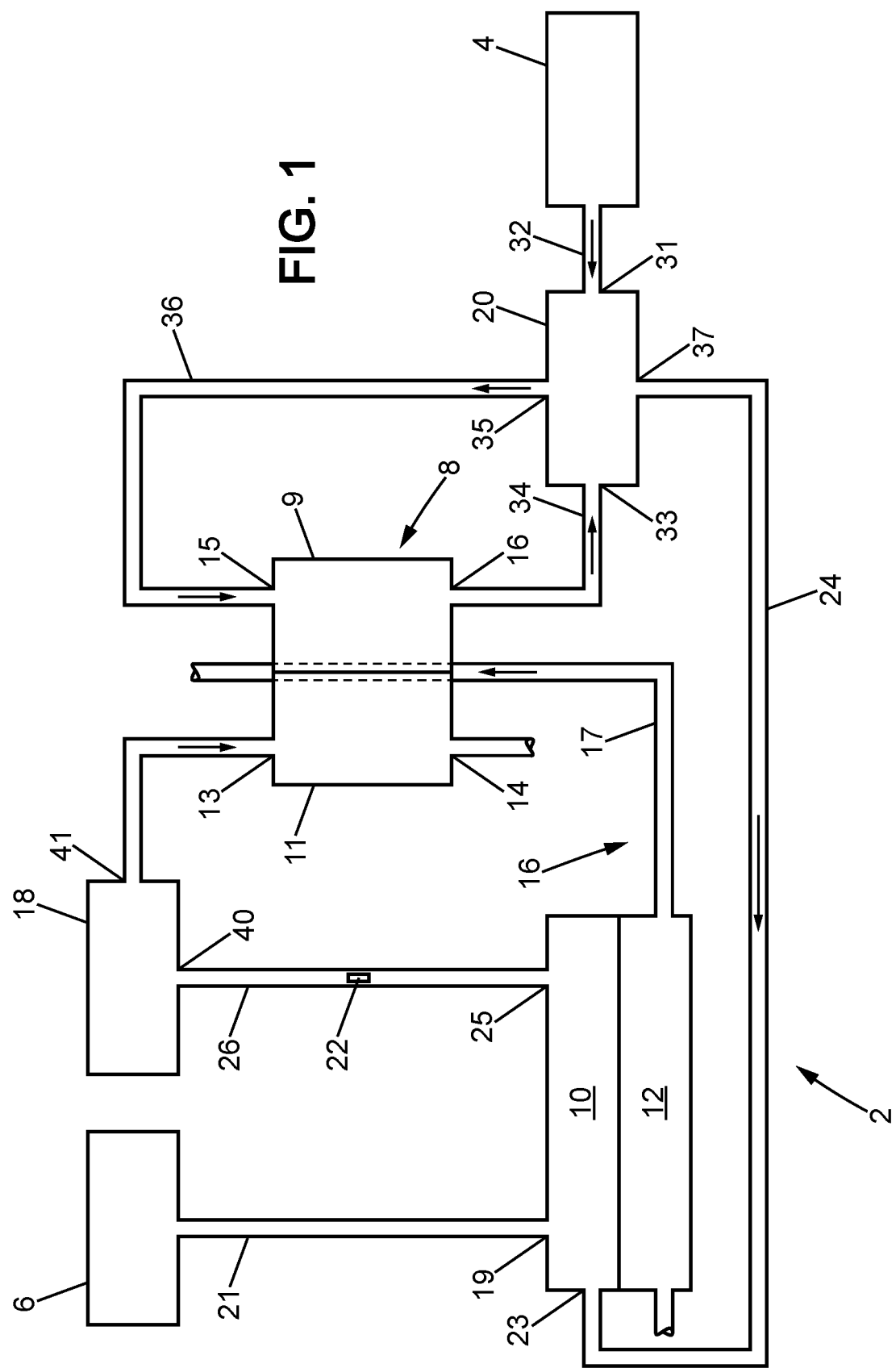

(51) Int. Cl.
*H01M 8/04225* (2016.01)
*H01M 8/04014* (2016.01)
*H01M 8/04089* (2016.01)
*H01M 8/04223* (2016.01)

(52) U.S. Cl.
CPC ... *H01M 8/04225* (2016.02); *H01M 8/04231* (2013.01); *H01M 8/04268* (2013.01); *H01M 2250/20* (2013.01)

(56) References Cited

U.S. PATENT DOCUMENTS

| | | |
|---|---|---|
| 2007/0128488 A1 | 6/2007 | Aoki et al. |
| 2012/0321978 A1 | 12/2012 | Steinhauser et al. |
| 2015/0140463 A1* | 5/2015 | Fischer, Jr. ............. E21B 36/02 429/441 |

OTHER PUBLICATIONS

Written Opinion of the International Searching Authority dated Jul. 18, 2019, issued in corresponding International Application No. PCT/FR2019/050863, filed Apr. 12, 2019, 6 pages.

* cited by examiner

FUEL CELL SYSTEM

The present invention lies within the field of fuel cell systems. A fuel cell system is an electrochemical generator that produces electricity from hydrogen and an oxidizing agent.

During a normal and trouble-free operation, fuel cells release hydrogen into their environment. These hydrogen leaks take place, for example, during nitrogen purge phases and/or during the start phase of the fuel cell (phase of injecting hydrogen to replace the gases present when off). These leaks can create an explosive atmosphere if left unchecked.

The hydrogen released in this manner may either be expelled into the system environment if it is "open" (for example to the exterior of cars), or diluted with a non-reactive gas such as air, or burnt.

In an aeronautical application, the fuel cell may be installed in the cabin. This is not an open environment. This environment can form an explosive atmosphere if hydrogen is released. In addition, the loss of hydrogen will reduce the specific energy and power of the fuel cell system. The specific power is the ratio between the power generated by the cell and the total mass of the fuel cell system. The specific energy is the ratio between the energy generated by the cell and the total mass of the fuel cell system. These two parameters are important in an airborne application in which low mass solutions are always looked for. Finally, the dilution of hydrogen requires the use of a diluent gas, which could add complexity to the system.

The aim of the invention is to provide a low-mass fuel cell system which can be used in a secure manner in an aircraft.

To this end, the present invention relates to a fuel cell system for an aircraft, comprising:
- a hydrogen burner comprising a first inlet suitable for receiving a first oxidizing agent, a second inlet capable of receiving at least hydrogen, and an outlet suitable for delivering a second oxidizing agent and heat;
- an oxidizing agent conditioning system having an inlet and an outlet, said inlet being suitable for receiving the second oxidizing agent and heat, said outlet being capable of delivering the conditioned second oxidizing agent; and
- at least one fuel cell having an anode and a cathode, the cathode comprising a cathode inlet connected to the outlet of the oxidizing agent conditioning system, the cathode inlet receiving the conditioned second oxidizing agent.

Advantageously, the fuel cell system according to the invention allows releasing the hydrogen from the cell without worrying about the external environment.

Advantageously, the fuel cell system according to the invention allows reusing the hydrogen lost during conventional operation. The fuel cell system according to the invention is therefore more efficient.

Advantageously, the hydrogen burner of the fuel cell system according to the invention generates heat which is used to heat the fuel cell and accelerate its start.

Advantageously, the fuel cell system according to the invention allows increasing the humidity level of the air at the cathode inlet of the fuel cell.

Advantageously, the fuel cell system according to the invention facilitates its cold start.

According to some particular embodiments, the fuel cell system has one or more of the following features, taken alone or in combination:
- The system comprises a pipe capable of conveying said at least the conditioned second oxidizing agent and heat, from the hydrogen burner to the oxidizing agent conditioning system, said pipe being connected to the outlet of the hydrogen burner and to the inlet of the oxidizing agent conditioning system;
- The system comprises a heat exchange device comprising:
  - a heat exchanger arranged adjacent to and in thermal contact with the hydrogen burner,
  - a heat transfer pipe connected to the heat exchanger and in thermal contact with the fuel cell,
  - a heat transfer fluid contained in arranged in the heat exchanger and in the heat transfer pipe, the heat transfer fluid being able to move from the heat exchanger and towards the heat transfer pipe in order to collect part of the heat generated by the hydrogen burner and convey said heat to the fuel cell, during the start phase of the fuel cell;
- The second oxidizing agent comprises water in vapor form;
- The system comprises a hydrogen concentration sensor arranged in the pipe;
- The system comprises a source of oxidizing agent that is suitable for providing oxidizing agent, a pipe connecting the source of oxidizing agent to the first inlet of the hydrogen burner;
- The anode comprises an anode inlet and an anode outlet, and the fuel cell system further comprises:
  - a tank capable of delivering hydrogen;
  - a hydrogen conditioning system comprising:
    - a first inlet capable of receiving hydrogen from the tank,
    - a first outlet suitable for delivering conditioned hydrogen to the anode inlet of the fuel cell;
    - a second inlet suitable for receiving a residual gas comprising hydrogen and nitrogen, from the anode outlet of the fuel cell;
    - a second outlet connected to the second inlet of the hydrogen burner in order to convey at least part of said residual gas to the hydrogen burner;
- The system comprises a compressor suitable for injecting the first oxidizing agent into the hydrogen burner, said compressor being arranged upstream of the first inlet of said compressor.

Figure 2:
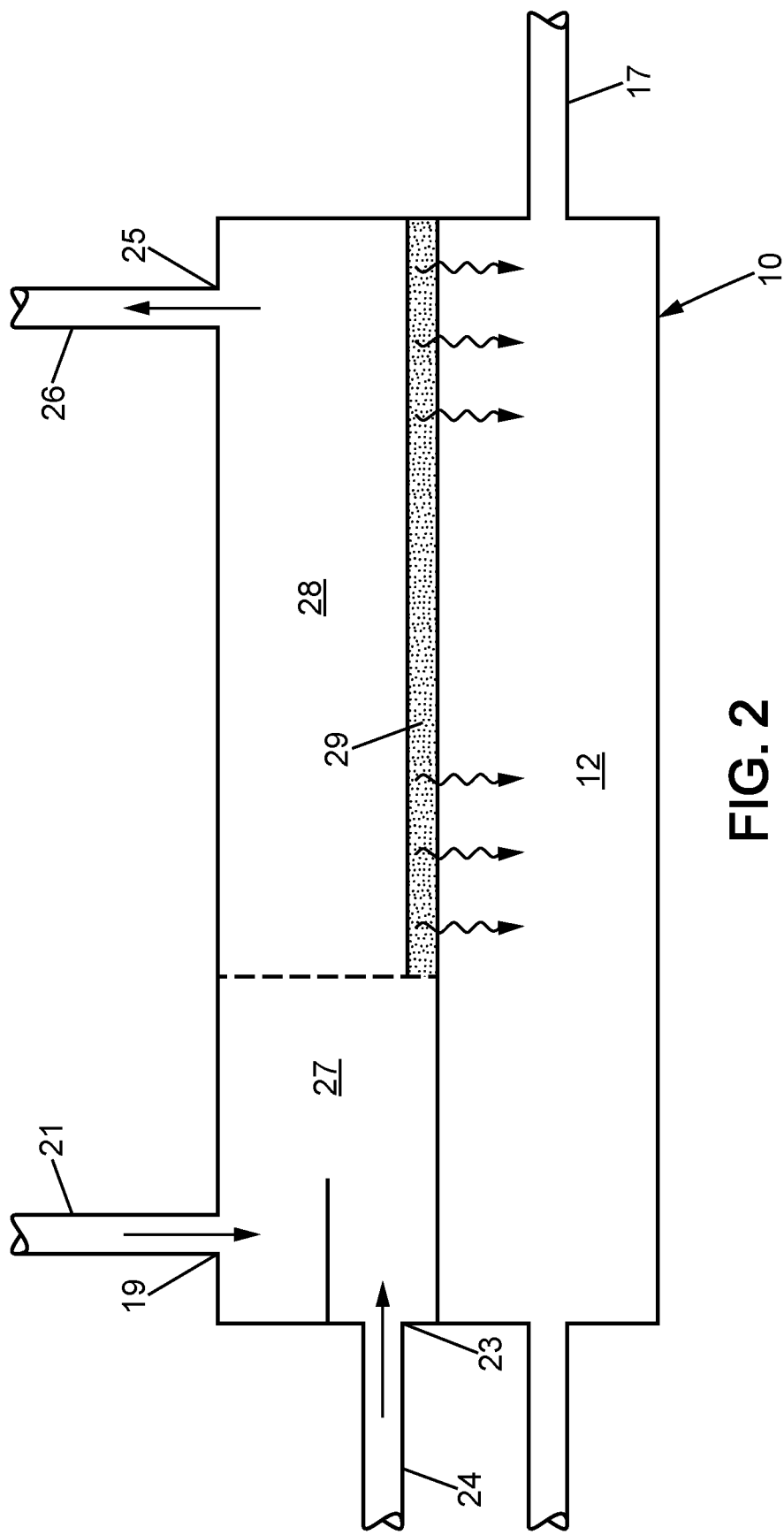
Figure 3:
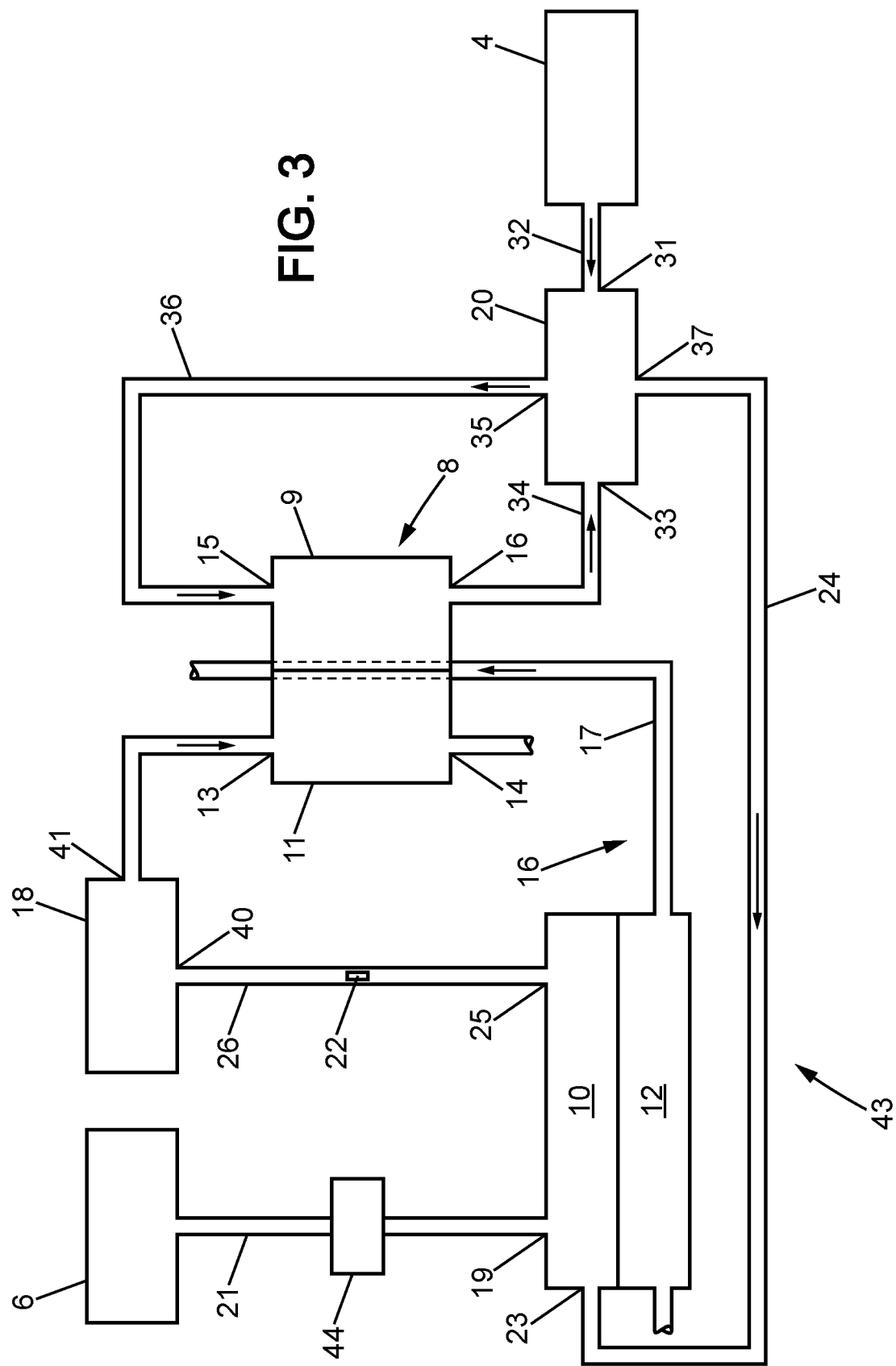

The invention will be better understood from reading the following description, given solely as an example and with reference to the figures:

FIG. 1 which is a schematic view of the fuel cell system according to a first embodiment of the invention;

FIG. 2 which is a schematic view of the hydrogen burner of the system illustrated in FIG. 1;

FIG. 3 which is a schematic view of the fuel cell system according to a second embodiment of the invention.

The fuel cell system 2 for aircraft according to the invention comprises a tank 4 capable of delivering hydrogen, a source of oxidizing agent 6, at least one fuel cell 8, and a catalytic hydrogen burner 10.

The fuel cell system 2 further comprises an oxidizing agent conditioning system 18 and a hydrogen conditioning system 20.

The tank 4 supplies the hydrogen necessary for the reaction of the fuel cell. It may be hydrogen that is stored or that is generated in situ.

The source of oxidizing agent 6 provides a first oxidizing agent necessary for the reaction of the fuel cell. This source may be a tank. The first oxidizing agent is pure oxygen or ambient air.

The fuel cell 8 is the site of the electrochemical reaction that produces electricity, water, and heat from hydrogen and oxygen. The cell comprises an anode 9 and a cathode 11. The anode 9 comprises an anode inlet 15 and an anode outlet 16. The cathode 11 comprises a cathode inlet 13 and a cathode outlet 14.

The catalytic hydrogen burner 10 is capable of burning hydrogen and generating heat and water in gas form. An example of a catalytic hydrogen burner 10 is schematically represented in FIG. 2. It comprises a first inlet 19 connected by a pipe 21 to the source of oxidizing agent 6, a second inlet 23 connected by a pipe 24 to the hydrogen conditioning system 20, and an outlet 25 connected by a pipe 26 to the oxidizing agent conditioning system 18, It comprises a mixing chamber 27, and a catalysis chamber 28 containing a catalyst 29.

The first inlet 19 and the second inlet 23 open into the mixing chamber 27. The hydrogen coming from the hydrogen conditioning system 20 is thus mixed, in the mixing chamber 27, with the first oxidizing agent coming from the source of oxidizing agent 6. The mixture thus formed passes into the catalysis chamber 28 where it is oxidized to a second oxidizing agent. This second oxidizing agent comprises water in gas form. This oxidation reaction produces heat. This second oxidizing agent generally has a temperature comprised between 40° C. and 100° C.

In order to detect a failure of the hydrogen burner 10, and because the mixture of hydrogen/oxidizing agent can be explosive within a certain range of concentrations, the fuel cell system 2 may also comprise a hydrogen concentration sensor 22 arranged between the hydrogen burner 10 and the oxidizing agent conditioning system 18. The sensor 22 is schematically represented in FIG. 1. The sensor 22 is for example fixed in pipe 26.

The oxidizing agent conditioning system 18 prepares the second oxidizing agent for the proper operation of the fuel cell in terms of temperature, pressure, humidity, and flow rate. It comprises an inlet 40 suitable for receiving the second oxidizing agent and the heat coming from the hydrogen burner 10, and an outlet 41 suitable for generating a conditioned second oxidizing agent. Inlet 40 is connected to the outlet 25 of the burner via pipe 26. Outlet 41 is connected to the cathode inlet 13 of the cell 8.

Advantageously, the preparation of the second oxidizing agent by the oxidizing agent conditioning system 18 is facilitated by the fact that the second oxidizing agent exiting the burner 10 is hot and humid.

The hydrogen conditioning system 20 comprises a first inlet 31 connected by a pipe 32 to the tank 4, a second inlet 33 connected by a pipe 34 to the anode outlet 16 of the cell, a first outlet 35 connected by a pipe 36 to the anode inlet 15 of the cell, and a second outlet 37 connected by pipe 24 to the second inlet of the hydrogen burner 10.

The hydrogen conditioning system 20 prepares the hydrogen for the proper operation of the fuel cell 8 in terms of temperature, pressure, humidity, and flow rate. Advantageously, pipe 34 and the hydrogen conditioning system 20 make it possible to reuse part of the unused hydrogen at the anode outlet of the cell by preparing it for a new use in the fuel cell.

The fuel cell system 2 further comprises a heat exchange device 16 partially represented in FIG. 1. This thermal device may be composed of a heat exchange loop. It comprises a heat exchanger 12 arranged adjacent to and in thermal contact with the hydrogen burner 10, a heat transfer pipe 17 connected to the heat exchanger 12 and in thermal contact with the fuel cell 8, and a heat transfer fluid contained in the heat exchanger 12 and heat transfer pipe 17.

The heat exchanger 12 may consist of part of the housing constituting the hydrogen burner as shown in FIG. 1.

In the example shown in FIG. 1, the heat exchanger 12 comprises an inlet for supplying heat transfer fluid and an outlet connected to the heat transfer pipe 17.

The heat transfer fluid is able to move between the heat exchanger 12 and the heat transfer pipe 17 in order to recover part of the heat generated by the oxidation reaction carried out in the hydrogen burner 10 and to convey this heat to the fuel cell 8. This heat will facilitate the start of the fuel cell 8. This heat may advantageously be used by certain devices of the aircraft after the cell is started. This heat for example may thus be used to heat water.

This heat exchange device 16 may advantageously be composed of the loop for the coolant of the fuel cell. Depending on the design and the amount of energy released, heat may also be removed by the flow of oxidizing agent (heat dissipation by convection).

FIG. 3 illustrates a fuel cell system 43 according to a second embodiment of the invention. The elements of the fuel cell system 43 according to the second embodiment which are identical or similar to elements of the system according to the first embodiment have the same references as in the first embodiment and will not be described again.

This fuel cell system 43 is similar to the fuel cell system 2 according to the first embodiment except that the first oxidizing agent comprises air, and system 43 further comprises a compressor 44 arranged between the source of oxidizing agent 6 and the hydrogen burner 10.

Advantageously, the compressor 44 makes it possible to control the amount of air introduced into the hydrogen burner 10. In addition, advantageously, the air entering the hydrogen burner 10 is hot. This improves efficiency and the initiation of its catalytic reaction.

When the cell starts up, the anode 11 of the cell contains a mixture of gases which must be removed and replaced by hydrogen. This mixture of gases contains hydrogen, nitrogen, and possibly other gases. This mixture of gases is called residual gas in the present patent application.

The operation of removing the residual gas is generally referred to as the "purge phase". During this purge phase, hydrogen is injected into the anode by the hydrogen conditioning system 20.

This massive injection of hydrogen makes it possible to remove almost all of the residual gas, which is conveyed to the hydrogen burner 10 via pipe 34, the hydrogen conditioning system 20, and pipe 24.

The hydrogen burner 10 oxidizes the residual gas and the first oxidizing agent originating from the source of oxidizing agent 6. It produces heat and a second oxidizing agent. This second oxidizing agent is formed by water in gas form (water vapor). The second oxidizing agent and some of the heat are transferred to the oxidizing agent conditioning system 18.

The conditioning system 18 prepares the second oxidizing agent in terms of temperature, pressure, and humidity, for use in the cell. Its work is facilitated by the fact that the second oxidizing agent is hotter and more humid than the first oxidizing agent originating from the source of oxidizing agent 6. The conditioning system 18 conveys the conditioned second oxidizing agent to the cathode inlet 13 of the fuel cell 8.

In parallel, part of the heat released by the oxidation reaction is conveyed to the coolant via the heat exchanger 12. This heat is communicated to the fuel cell via the coolant pipe 17. This heat facilitates starting the fuel cell 8.

After starting the fuel cell 8, during normal operation of the cell this heat is carried away by the heat transfer fluid towards devices of the aircraft.

During normal operation of the cell, nitrogen originating from the cell's composition gradually enters the anode 9. When the amount of nitrogen is too high, this interferes with the operation of the cell. Consequently, the fuel cell system 2, 43, either continuously or from time to time (or both), performs purge phases during which the residual gas consisting of hydrogen and nitrogen and exiting the anode outlet 16 is not processed by the conditioning system 20 and reinjected into the cell through the anode inlet 15, but is conveyed to the hydrogen burner 10 via pipe 24.

In parallel, the hydrogen conditioning system 20 also conveys hydrogen to the hydrogen burner 10 for the production of the second oxidizing agent. The hydrogen conditioning system 20 is able to regulate the amounts of hydrogen coming from the tank 4 and the amounts of residual gas to be conveyed to the hydrogen burner 10.

In conventional fuel cell systems, the residual gas is released into the atmosphere. This venting into the atmosphere is hazardous when carried out in an aircraft. With the fuel cell system according to the invention, the hydrogen and nitrogen are consumed, so the risk of creating an explosive atmosphere is reduced and even eliminated. The reaction is exothermic, so is therefore used to heat either the cell when starting it up, or the devices of the aircraft in order to generate hot water in the restrooms for example.

By burning the hydrogen before entering the fuel cell, the fuel cell system according to the invention makes it possible to:
  heat with gas and help heat the fuel cell 8 during its start.
  facilitate cold starts (freezing condition) of the fuel cell, which is a true challenge.
  increase the humidity, at the inlet, of the oxidizing agent of the fuel cell (necessary for an LT-PEM cell)
  hydrogen is no longer released into the environment of the system, which eliminates the risk of increasing the concentration of hydrogen to the point that an explosive atmosphere is reached.

The invention claimed is:

1. A fuel cell system for an aircraft, comprising:
   a hydrogen burner comprising a first inlet suitable for receiving a first oxidizing agent, a second inlet capable of receiving at least hydrogen, and first outlet suitable for delivering a second oxidizing agent and heat;
   an oxidizing agent conditioning system having third inlet and a second outlet, said third inlet being suitable for receiving said second oxidizing agent and said heat, said second outlet being capable of delivering the conditioned second oxidizing agent; and
   at least one fuel cell having an anode and a cathode, the cathode comprising a cathode inlet connected to the second outlet of the oxidizing agent conditioning system, the cathode inlet receiving the conditioned second oxidizing agent.

2. The fuel cell system according to claim 1, further comprising a pipe capable of conveying said conditioned second oxidizing agent and heat, from the hydrogen burner to the oxidizing agent conditioning system, said pipe being connected to the first outlet of the hydrogen burner and to the third inlet of the oxidizing agent conditioning system.

3. The fuel cell system according to claim 1, further comprising a heat exchange device comprising:
   a heat exchanger arranged adjacent to and in thermal contact with the hydrogen burner;
   a heat transfer pipe connected to the heat exchanger and in thermal contact with the fuel cell; and
   a heat transfer fluid contained in the heat exchanger and in the heat transfer pipe, the heat transfer fluid being able to move from the heat exchanger and towards the heat transfer pipe in order to collect part of the heat generated by the hydrogen burner and convey said heat to the fuel cell, during a start phase of the fuel cell.

4. The fuel cell system according to claim 1, wherein the second oxidizing agent comprises water in vapor form.

5. The fuel cell system according to claim 2, further comprising a hydrogen concentration sensor arranged in the pipe.

6. The fuel cell system according to claim 1, further comprising a source of the oxidizing agent that is suitable for providing oxidizing agent, wherein a pipe connects the source of the oxidizing agent to the first inlet of the hydrogen burner.

7. The fuel cell system according to claim 1, wherein the anode comprises an anode inlet and an anode outlet, and wherein the fuel cell system further comprises:
   a tank capable of delivering hydrogen;
   a hydrogen conditioning system comprising:
     a fourth inlet capable of receiving hydrogen from the tank;
     a third outlet suitable for delivering conditioned hydrogen to the anode inlet of the fuel cell;
     a fifth inlet suitable for receiving a residual gas comprising hydrogen and nitrogen, from the anode outlet of the fuel cell; and
     a fourth outlet connected to the second inlet of the hydrogen burner in order to convey at least part of said residual gas to the hydrogen burner.

8. The fuel cell system according to claim 1, further comprising a compressor suitable for injecting the first oxidizing agent into the hydrogen burner, said compressor being arranged upstream of the second inlet.

9. A fuel cell system for an aircraft, comprising:
   a hydrogen burner comprising a first inlet suitable for receiving a first oxidizing agent, a second inlet capable of receiving at least hydrogen, and first outlet suitable for delivering a second oxidizing agent and heat;
   an oxidizing agent conditioning system having third inlet and a second outlet, said third inlet being suitable for receiving said second oxidizing agent and said heat, said second outlet being capable of delivering the conditioned second oxidizing agent;
   at least one fuel cell having an anode and a cathode, the cathode comprising a cathode inlet connected to the second outlet of the oxidizing agent conditioning system, the cathode inlet receiving the conditioned second oxidizing agent; and
   a heat exchange device comprising:
     a heat exchanger arranged adjacent to and in thermal contact with the hydrogen burner;
     a heat transfer pipe connected to the heat exchanger and in thermal contact with the fuel cell; and
     a heat transfer fluid contained in the heat exchanger and in the heat transfer pipe, the heat transfer fluid being able to move from the heat exchanger and towards the heat transfer pipe in order to collect part of the heat generated by the hydrogen burner and convey said heat to the fuel cell, during a start phase of the fuel cell.

\* \* \* \* \*